United States Patent [19]
William Daft

[11] Patent Number: 5,817,023
[45] Date of Patent: Oct. 6, 1998

[54] ULTRASOUND IMAGING SYSTEM WITH DYNAMIC WINDOW FUNCTION GENERATOR

[75] Inventor: Christopher Mark William Daft, Schenectady, N.Y.

[73] Assignee: General Electrical Company, Schenectady, N.Y.

[21] Appl. No.: 854,733

[22] Filed: May 12, 1997

[51] Int. Cl.$^6$ .................................................. A61B 08/00
[52] U.S. Cl. ........................... 600/447; 600/455; 73/626
[58] Field of Search ............................ 359/559; 600/447, 600/455, 457; 73/626

[56] References Cited

U.S. PATENT DOCUMENTS

| | | | |
|---|---|---|---|
| 5,186,175 | 2/1993 | Hirama et al. ........................... | 600/447 |
| 5,329,903 | 7/1994 | Thomas, II et al. ..................... | 600/447 |
| 5,345,939 | 9/1994 | Engeler et al. ..................... | 128/661.01 |
| 5,520,186 | 5/1996 | Deitrich .................................... | 73/626 |

OTHER PUBLICATIONS

Wright, "Resolution Issues in Medical Ultrasound", in Proc. 1985 IEEE Ultrasonics Symp., New York IEEE, 1985, pp. 793–799.

Maslak, " Computed Sonography", in Ultrasound Annual 1985, ed. Sanders et al., New York: Raven Press, 1985, pp. 1–16.

Bresenham, "Algorithms for Circular Arc Generation", in Fundamental Algorithms for Computer Graphics, ed. by Earnshaw, NATO ASI Series, vol. F17, Springer–Verlag, Berlin/Heidelberg, 1985, pp. 197–217.

Harris, "On the Use of Windows for Harmonic Analysis with the Discrete Fourier Transform", Proc. IEEE, vol. 66, No. 1, Jan. 1978, pp. 51–83.

*Primary Examiner*—Marvin M. Lateef
*Assistant Examiner*—Maulin Patel
*Attorney, Agent, or Firm*—Marvin Snyder; Douglas E. Stoner

[57] ABSTRACT

A phased array sector scanning ultrasonic system includes a separate receive channel for each respective element in an ultrasonic transducer array. Each receive channel imparts a delay to the echo signal produced by each respective element. The delayed echo signals are summed to form a steered, dynamically focused and dynamically windowed receive beam. A plurality of channels in the receiver are operated by respective receive channel control circuits to apodize the sampled echo signals produced by the transducer array elements with respective selected window function weighting factors as the echo signals are received. Each receive channel control circuit stores a set of window function weighting factors at successive address locations in a memory and includes an addressing circuit for producing an address useable by the memory to provide a desired window function weighting factor for each receive channel from the stored set. The addressing circuit produces a signal representing the derivative of the address, which is then integrated before being used to address the memory.

9 Claims, 8 Drawing Sheets

ULTRASOUND IMAGING SYSTEM WITH DYNAMIC WINDOW FUNCTION GENERATOR

FIELD OF THE INVENTION

This invention relates to vibratory energy imaging and, in particular, to phased array ultrasound imaging systems with dynamic windowing.

BACKGROUND OF THE INVENTION

One mode in which ultrasound can be used to produce images of objects involves placing the ultrasound transmitter on one side of the object and transmitting the sound through the object to the ultrasound receiver placed on the other side ("transmission mode"). With transmission mode methods, an image is produced in which the brightness of each pixel is a function of either the amplitude of the ultrasound that reaches the receiver ("attenuation" mode), or the time required for the sound to reach the receiver ("time-of-flight" or "speed of sound" mode). Alternatively, the receiver may be positioned on the same side of the object as the transmitter and an image is produced in which the brightness of each pixel is a function of the amplitude of the ultrasound reflected from the object back to the receiver ("refraction", "backscatter" or "echo" mode). The present invention relates to a backscatter method for producing ultrasound images.

There exist a number of well-known backscatter methods for acquiring ultrasound data. In the original "A-scan" method, an ultrasound pulse is directed into the object by the transducer and the amplitude of the reflected sound is recorded over a period of time. The amplitude of the echo signal is proportional to the scattering strength of the reflectors (or "scatterers") in the object and the time delay is proportional to the range of the scatterers from the transducer. In the original so-called "B-scan" method, the transducer transmits a series of ultrasonic pulses as it is scanned across the object along a single axis of motion. The resulting echo signals are recorded as with the A-scan method and their amplitude can be used to modulate the brightness of pixels on a display. With the B-scan method, enough data are acquired from which an image of the refractors can be reconstructed.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage waveform is applied, each piezoelectric element emits an ultrasonic wave into the media to which it is coupled, at the frequencies contained in the excitation waveform. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere.

When used for ultrasound imaging, the transducer typically has a number of piezoelectric elements arranged in an array and driven with separate voltages (apodizing). By controlling the time delays (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delays and amplitude of successive applications of the applied voltages, the beam with its focal point can be moved in a plane to scan the subject.

When the transducer is employed to receive the reflected sound (receiver mode), voltages are produced at the transducer elements in the array and are summed together such that the net signal is indicative of the sound reflected from a single focal point in the subject. As with the transmission mode, this focused reception of the ultrasonic energy is achieved by imparting separate time delays (and/ or phase shifts) and gains to the signal from each transducer array element. In addition, to reduce side lobes in the receive beam the amplitude of each transducer element signal is modified in accordance with a window function prior to summation into the focused beam.

The ultrasound scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90° sector, with each scan line being steered in increments of 0.70°.

The time delay and phase shift applied to the signal received by each transducer array element in order to produce a steered and focused receive beam changes as the reflected ultrasonic wave is being received. In addition, the amplitude of each transducer element signal is modified in accordance with the window function to reduce side lobes in the focused receive beam. This smooth magnitude-weighting window function is applied across the entire array of transducer elements which are actively receiving echo signals at any moment in time, and since the number of active transducer elements changes as a function of time, so does the application of the window function; that is, the magnitude-weighting factor applied to the echo signal received by each transducer element in order to apply the smooth window function to the receive beam changes as a function of time and must be continuously recalculated during the receive process.

Calculation of the window function weighting factor for any transducer element is relatively simple when a sector scan is performed and the beam is formed about the center of the transducer array. In this case the receive aperture of the array is opened at a uniform rate by progressively adding transducer element signals symmetrically on each side of the center element to the receive beam. This results in a uniform widening of the window function, with the center of the window function remaining positioned at the center of the transducer array, until all transducer elements are contributing to the receive beam.

When the array is operated with a linear scan, or offset sector scan mode, calculation of the window function weighting factor becomes complex because these modes traditionally form beams with phase centers that move laterally along the length of the transducer array aiming at either θ=0° (for imaging) or θ=20° (for Doppler). The same problem arises for a convex or curvilinear transducer. As a result, the window function widens symmetrically about the beam origin or phase center (not the central axis of the array) during a first receive interval, and will continue to widen at a different rate and not be centered about the beam origin during a second receive interval. The first receive interval ends when all the transducer elements to one side of the beam origin have been included in the receive aperture, and the second receive interval ends when all transducer elements to the other side have been included. Subsequently, the receive aperture is fully open and the window function is constantly applied over all the transducer elements to properly weight their signals.

U.S. Pat. No. 5,345,939 to Engeler et al., and assigned to the instant assignee, discloses dynamic adjustment of the window function weighting factors applied to each receive channel in an ultrasonic imaging system. For each receive channel, the system provides a window weighting factor that is dynamically changed during receipt of an echo signal by a digital circuit. This enables the circuit to be included as part of a digital integrated circuit along with other digital receive channel circuits. This prior art system provides dynamic window weighting factors for each transducer element echo signal in an array which produces a beam that emanates from any position in the array. When the beam center emanates from a location other than the physical center of the transducer array, the window function opens with the receive aperture in three distinct stages. A dynamic calculating circuit determines when each of these stages applies and dynamically calculates the corresponding window weighting factor while in that stage.

The system disclosed in U.S. Pat. No. 5,345,939 further provides a dynamic digital circuit which can be configured to apply different window functions to the receive beam, which is applicable to any transducer element in the array, and which will accommodate a beam emanating from any location in the array. Before each beam firing, initial conditions are downloaded to each receive channel's integrated circuit to configure the dynamic calculating circuit for that firing with a set of parameters determined in accordance with the location of the receive channel transducer in the array and in accordance with the location from which the beam center emanates.

SUMMARY OF THE INVENTION

In an ultrasound imaging system, it is necessary to accurately control the amplitude of the signal received by each element in the array. The present invention is a method for providing this "shading" or "apodizing" of the aperture which can be efficiently implemented in a digital integrated circuit.

The need for a windowed, shaded or tapered aperture in an ultrasonic imager can be seen by considering the approximate Fourier transform relationship between the aperture function and the shape of the ultrasonic beam. Since it is necessary to enlarge the active aperture as the sound is received from deeper locations in the body, the window function needs to vary with time.

The purpose of the present invention is to compute a window function for complex apertures such as linear and curvilinear arrays. Sector arrays can also be tapered with this approach. The aperture which needs to be produced may be expressed as:

$$a(x, t) = f\left[\frac{x + c(t)}{w(t)}\right] \quad (1)$$

In Eq. (1), f is the window function, w(t) is its width, and c(t) is its offset from the center of the aperture. Dynamic shading or apodizing is complicated for linear and curvilinear transducers because the phase center and physical center of the aperture are not coincident. The functional dependence f is implemented using a random access memory (RAM). In contrast to the prior art, this RAM is used without an interpolator to minimize the size of the RAM. In the present invention, control structures are replaced with simpler circuitry, such as RAM, which is preferable for design efficiency.

The circuitry of the invention further comprises means for generating the RAM address. The offset c(t) and window function width w(t) have simple functional forms when viewed from the perspective of the entire aperture:

$$w(t) = k_1 t \quad (2)$$

$$c(t) = \begin{cases} p & \text{if } n \leq n_e \\ p + k_2 t & \text{if } n_e < n \leq n_m \\ x_{max}/2 & \text{if } n > n_m \end{cases} \quad (3)$$

where $x_{max}$ is half the extent of the aperture; p is its phase center; n is the range clock count (10 MHz in the present invention), and $k_1$ and $k_2$ are constants. However, the integrated circuit sees only the development of one channel's amplitude as a function of time. A good approximation to the awkward single-channel form treats the amplitude as a piecewise hyperbolic function:

$$y(n) = \begin{cases} 0 & \text{if } n < n_s \\ g_s n_s - g_s n_s^2/n & \text{if } n_s < n \leq n_e \\ g_e n_e - g_e n_e^2/n & \text{if } n_e < n \leq n_m \\ g_m n_m - g_m n_m^2/n & \text{if } n > n_m \end{cases} \quad (4)$$

where $g_s$, $g_e$ and $g_m$ are the dynamic shading gradients before $n_e$, between $n_e$ and $n_m$, and after $n_m$, where $n_s$ is the range clock count when the given channel begins to receive data, $n_e$ is the count n for the near edge of the aperture, and $n_m$ is the count n for the far edge of the aperture. Equation (4) describes the most complex form of the address y(n), which occurs when the parameters specifying the position of the channel in the aperture, $n_s$, $n_e$ and $n_m$ are related by $n_s \leq n_e \leq n_m$. Although up to three hyperbolae need to be produced having signs which may differ from those in Eq. (4), the function y(n) can be assumed to be continuous. This is because the purpose of the dynamic shading is to avoid any discontinuity in amplitude at any time during opening of the aperture. The prior art system of U.S. Pat. No. 5,345,939 requires, at the critical times $n_s$, $n_e$ and $n_m$, that the circuit perform a complex resetting operation. To avoid the resets which occur at $n_s$, $n_e$ and $n_m$ in the prior art system, the method of the present invention computes the derivative dy/dn of the desired function rather than the function y(n) itself. In the context of the lookup table-driven design of the present invention, there is no need to abruptly alter the RAM address in which the window function is stored. This simplifies implementation of the circuit.

BRIEF DESCRIPTION OF THE DRAWINGS

FIGS. 2a and 2b are graphical illustrations of the signal in any of the channels of the transmitter shown in FIG. 2.

DETAILED DESCRIPTION OF THE PREFERRED EMBODIMENTS

Figure 1:
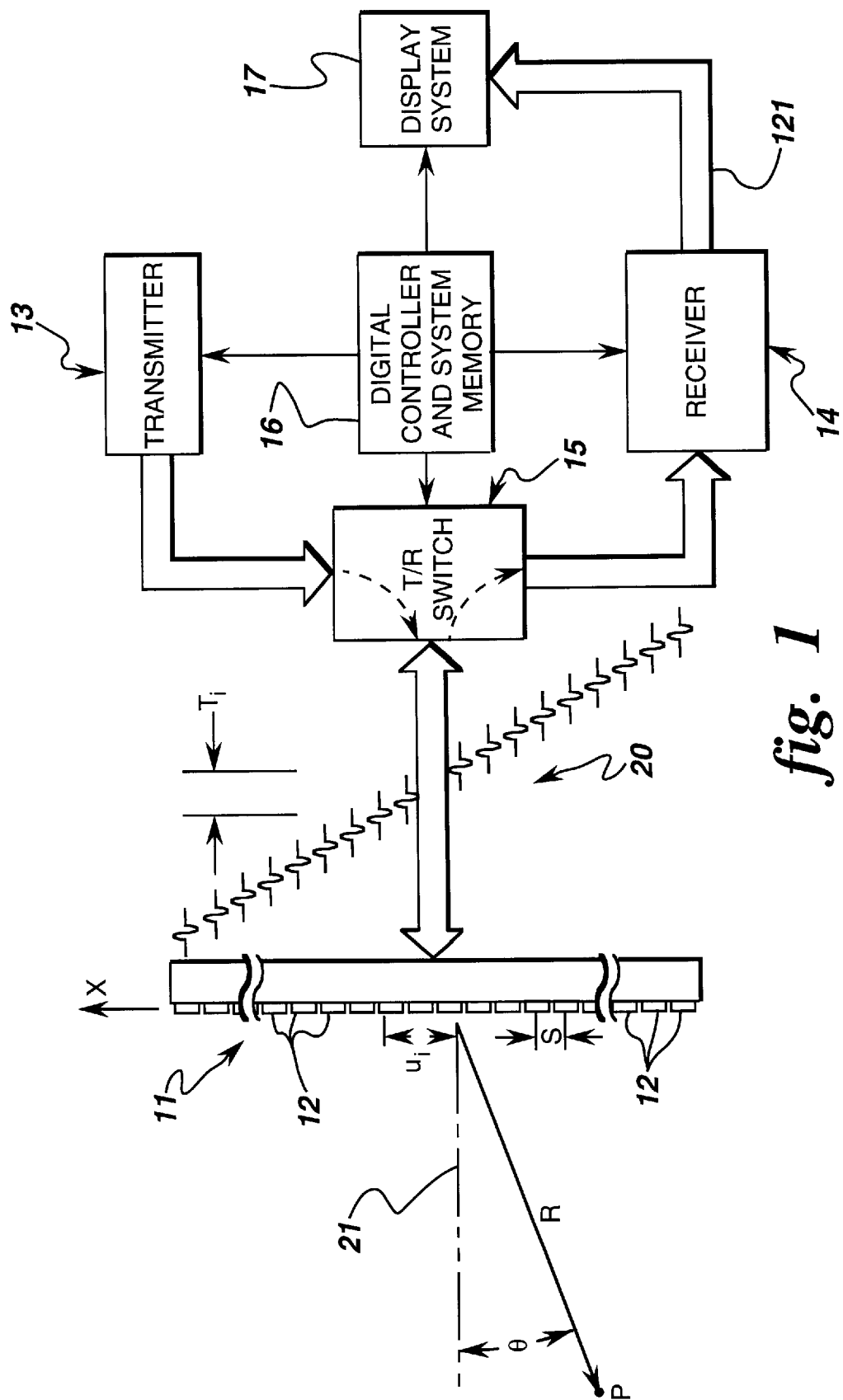
FIG. 1 is a block diagram of an ultrasound imaging system employing the invention.

FIG. 1 illustrates an ultrasonic imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller and system memory 16 responsive to commands by a human operator. A complete scan is performed by acquiring a series of echoes in which switches 15 are set to the transmit position, transmitter 13 is gated on momentarily to energize each transducer element 12, switches 15 are then set to the receive position and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the ultrasonic energy produced is directed, or steered, in a beam. A B-scan can therefore be performed by moving this beam through a set of angles from point to point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased as illustrated in FIG. 1, the ultrasonic beam is directed downward from central axis 21 by an angle θ. The relationship between the time delay increment $T_i$ added successively to each i-th signal from one end of the transducer array (i=1) to the other end (i=n) is given by the relationship:

$$T_i = R_T/C - \sqrt{(R_T/C)^2 + (x/C)^2 + 2xR_T\sin\theta/C^2} \quad (5)$$

where x is the distance of the center of an element i from the phase center of transducer array, θ is the transmit beam angle, C is the velocity of sound in the object under study, and $R_T$ is the range at which the transmit beam is focused.

The time delays $T_i$ in Eq. (5) have the effect of steering the beam in the desired angle and causing it to be focused at a fixed range $R_T$. A sector scan is performed by progressively changing time delays $T_i$ in successive excitations. The angle θ is thus changed in increments to steer the transmitted beam in a succession of directions. When the direction of the beam is above central axis 21, the timing of pulses 20 is reversed, but the formula of Eq. (5) still applies.

The echo signals produced by each burst of ultrasonic energy emanate from reflecting objects located at successive positions (R) along the ultrasonic beam. These are sensed separately by each element 12 of transducer array 11 and a sample of the magnitude of the echo signal at a particular point in time represents the amount of reflection occurring at a specific range (R). Due to differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each, and sum them together to provide a single echo signal which accurately indicates the total ultrasonic energy reflected from point P located at range R along the ultrasonic beam oriented at angle θ. Receiver 14 also applies weighting factors to the separate echo signals such that a smooth window function is applied to suppress side lobe signals that would otherwise degrade the focused receive beam by reducing its contrast resolution.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles (θ) is performed to provide the data necessary for display.

To coherently sum the electrical signals produced by the echoes received at each transducer element 12, time delays and phase shifts are introduced into each separate transducer element channel of receiver 14. The beam time delays for reception are the same delays ($T_i$) as the transmission delays described above. However, in order to dynamically focus the receive beam, the time delay and phase shift of each receiver channel is continuously changed during reception of the echo to provide dynamic focusing of the received beam at the range R from which the echo signal emanates. The equation for the time delay imposed on the signal received by each transducer element is:

$$T_d = t/2 - \sqrt{(t/2)^2 + (x/C)^2 - (xt/C)\sin\theta} \quad (6)$$

where t is the elapsed time after sound is transmitted from the center of the transducer array (i.e. START). The same calculation, suitably scaled, also provides the correct phase shift.

Under direction of digital controller 16, receiver 14 provides delays during the scan such that the steering of receiver 14 tracks with the direction of the beam steered by transmitter 13, samples the echo signals at a succession of ranges and provides the proper delays and phase shifts to dynamically focus at points P along the beam. Thus each emission of an ultrasonic pulse waveform results in acquisition of a series of data points which represent the amount of reflected sound from a corresponding series of points P located along the ultrasonic beam.

Figure 7A:
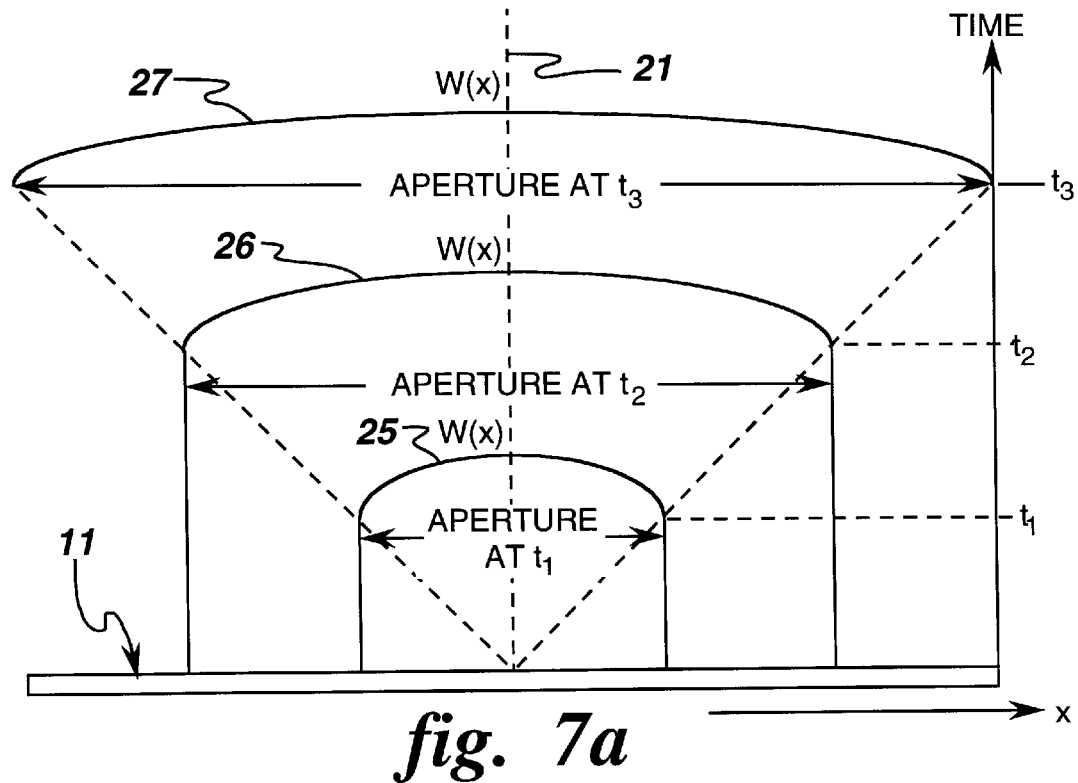
FIGS. 7a and 7b are graphical representations of the window function as the receive aperture opens for a centered and an off-center beam, respectively.

For proper receive apodization, the receive aperture is dynamically opened, beginning at the phase center of the transducer when the receiver is switched on, and is widened as a function of time. For this operation, the number of transducer elements activated, and the size of the f-stop selected, are design choices. A convenient choice for number of transducer elements is 128. In a preferred embodiment, an f-stop F of "two" is provided, which means that at any moment during receipt of the echo signal, the effective width of the active array elements is one half the distance R to the dynamically changing focal point. The f-stop may be defined as the ratio of active array length to the range R. The objective is to maintain the f-stop number F constant as the receive aperture opens. Referring to FIG. 7a in conjunction with FIG. 1, this means that during reception of the echo signal, only a few transducer elements 12 adjacent to the beam direction 21 are initially enabled (at time $t=t_1$ or, equivalently, $n=n_s$) to contribute to the receive beam, but as time passes (time $t=t_2$ or $n=n_e$) and the echo signal is received over longer ranges, the number of enabled receiver channels is increased to increase the receive aperture. Eventually (at time $t=t_3$ or $n=n_m$) the aperture is fully open to include all 128 transducer array elements 12. With the beam phase center located at the center of transducer array 11, it can be seen in FIG. 7a that the receive aperture opens symmetrically about central axis 21 at a uniform rate until it is fully open at 128 elements.

If the echo signal from each transducer element 12 within the currently active receive aperture is equally weighted (W(x)=1 for all channels x), high side lobe levels are formed on the receive beam. This results from the physics of phased array systems, as known in the art, and means that echo signals from locations to either side of beam angle θ contribute to the focused beam signal produced by receiver 14. This contribution to the received signal makes it difficult to interpret the signal and is particularly troublesome, for example, when images of small, low-signal structures such as cysts are sought, and these structures are surrounded by highly reflective structures. With a uniformly weighted aperture, the receiver sensitivity pattern approximates sinc $[(\pi N\Delta x/\lambda) \sin \theta]$ when the beam is steered broadside to the array, where N is the number of elements, $\Delta x$ is the beam spacing, and $\lambda$ is the wavelength.

The solution to the above-described side lobe problem is to weight the signals from the separate transducer elements in the receive aperture in a non-uniform manner. Such aperture weighting factor is referred to in the art as a window function or apodizing function or shading function W(x). The system is capable of operating with any one of a variety of window functions, selected by design choice. The window function has a value of "1" at the center of the receive aperture, and smoothly and symmetrically drops in value until it is a small value or zero at each end of the aperture. Such window function is illustrated in FIG. 7a by curve 25 for the aperture at time $t=t_1$, by curve 26 at time $t=t_2$, and by curve 27 at time $t=t_3$. When the beam direction intersects the center of the transducer array, as shown in FIG. 7a, the window function W(x) is stretched in width at a uniform rate determined by the rate at which the receive aperture is opened, and remains symmetrical about the beam axis at all times. For any receiver channel therefore, the value of the window function weighting factor which should be applied to the echo signal produced by its associated transducer element may be calculated.

Figure 7B:
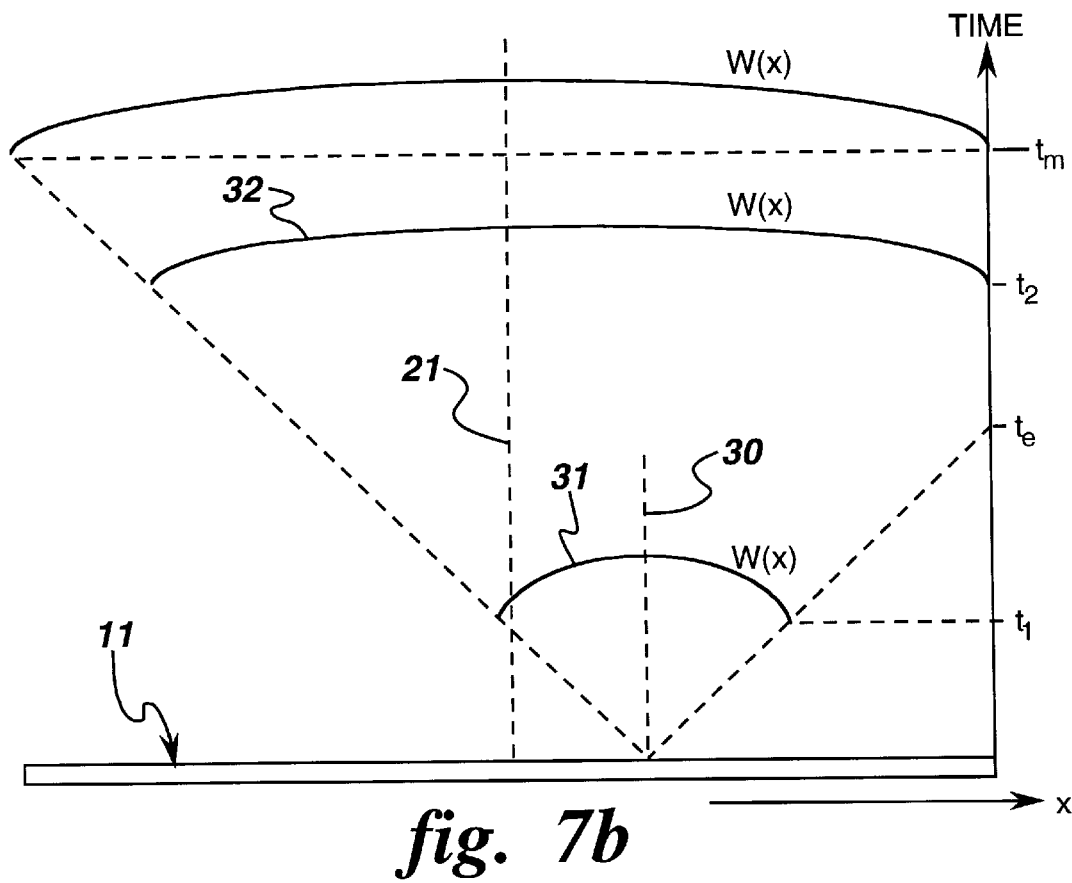

When the system is operated with a linear transducer array in which the beam center may not correspond to the center of transducer array 11, the calculation becomes more complex. Referring to FIG. 7b, when a beam 30 does not emanate from the array center at central axis 21, the receive aperture opens in two stages. During the first stage, at time $t=t_1$, the receive aperture is symmetrical about the axis of beam 30 and the window function is also symmetrical as indicated by curve 32. This first stage continues until the receive aperture is opened to the point where the nearest end (the right-hand end in FIG. 7b) of the associated transducer 11 is reached at time $t=t_e$. When this occurs, a second stage begins in which the receive aperture continues to open, but only to one side of the beam axis (the left-hand side in FIG. 7b) and at one half the rate. As a result, a window function 32 at time $t=t_2$ is employed and is not as wide as the corresponding window function 26 in the centered beam of FIG. 7a nor is it symmetrical about the axis of beam 30. Eventually, of course, the receive aperture is fully opened at time $t=t_m$, and the resulting window function 33 is the same as the window function 27 for the centered beam of FIG. 7a. A primary objective of the present invention is to provide a window weighting factor for each of the receiver channels so as to produce the proper window function for the opening receive aperture. How this is done is discussed in more detail below.

Figure 2:
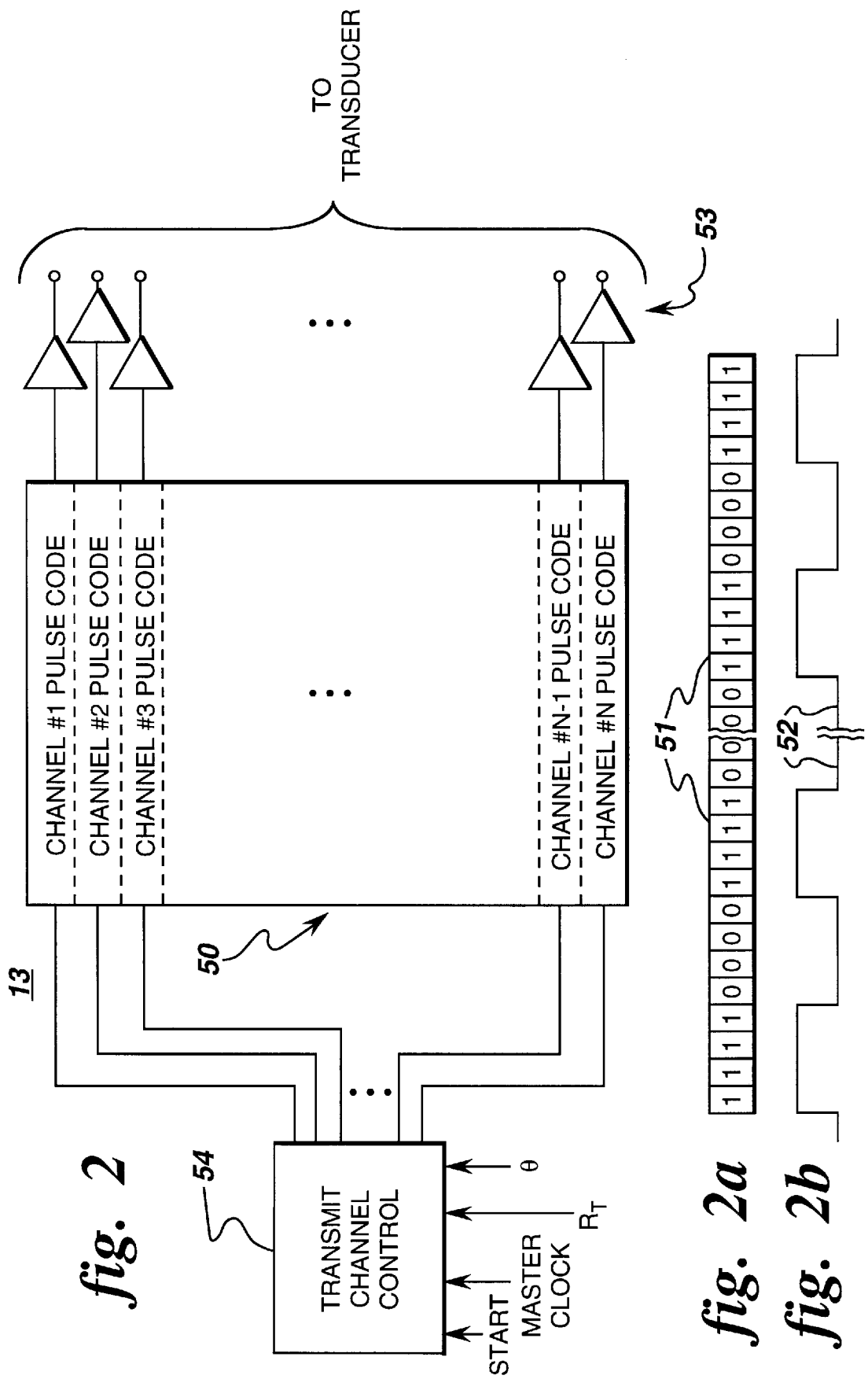
FIG. 2 is a block diagram of a transmitter which forms part of the system of FIG. 1.

Referring to FIG. 2 in conjunction with FIG. 1, transmitter 13 includes a set of channel pulse code memories indicated collectively as memories 50. In the preferred embodiment there are 128 separate transducer elements 12, and therefore there are 128 separate channel pulse code memories 50. Each pulse code memory 50 is typically a 2-bit by 512-bit memory which stores a bit pattern 51 (see FIG. 2a) that determines the frequency of ultrasonic pulse 52 (see FIG. 2b) is to be produced. In the preferred embodiment this bit pattern is read out of each pulse code memory 50 by a 40 MHz master clock and applied to a respective driver 53 which amplifies the signal to a power level suitable for driving the respective transducer element 12 (FIG. 1). In the example shown in FIG. 2a, the bit pattern is a sequence of four "1" bits alternated with four "0" bits to produce a 5 MHz ultrasonic pulse 52, although other carrier frequencies ($F_0$) may alternatively be employed in the preferred embodiment, such as 2.5, 3.75, 6.25, 7.5, 8.75 and 10 MHz. The transducer elements 11 (FIG. 1) to which these ultrasonic pulses 52 are applied respond by producing ultrasonic energy.

As indicated above, to steer the transmitted beam of ultrasonic energy in the desired direction (θ), pulses 52 for each of the n channels must be delayed by the proper amount. These delays are provided by a transmit control 54 which receives four control signals (START, MASTER CLOCK, $R_T$ and θ) from digital controller 16 (FIG. 1). Using the input control signal θ, the fixed transmit focus $R_T$, and Eq. (5), transmit control 54 calculates the delay increment $T_i$ required between successive transmit channels. When the START control signal is received, transmit control 54 gates one of four possible phases of the 40 MHz MASTER CLOCK signal through to the first transmit channel (channel #1). At each successive delay time interval ($T_i$) thereafter, the 40 MHz MASTER CLOCK signal is gated through to the next channel pulse code memory 50 until all n=128 channels are producing their ultrasonic pulses 52 (FIG. 2b). Each transmit channel 50 is reset after its entire bit pattern 51 (FIG. 2a) has been transmitted and transmitter 13 then waits for the next θ and next START control signals from digital controller 16. As indicated above, in the preferred embodiment of the invention a complete B-scan is comprised of 128 ultrasonic pulses steered in Δθ increments of 0.70° through a 90° sector centered about central axis 21 (FIG. 1) of transducer 11.

Figure 3:
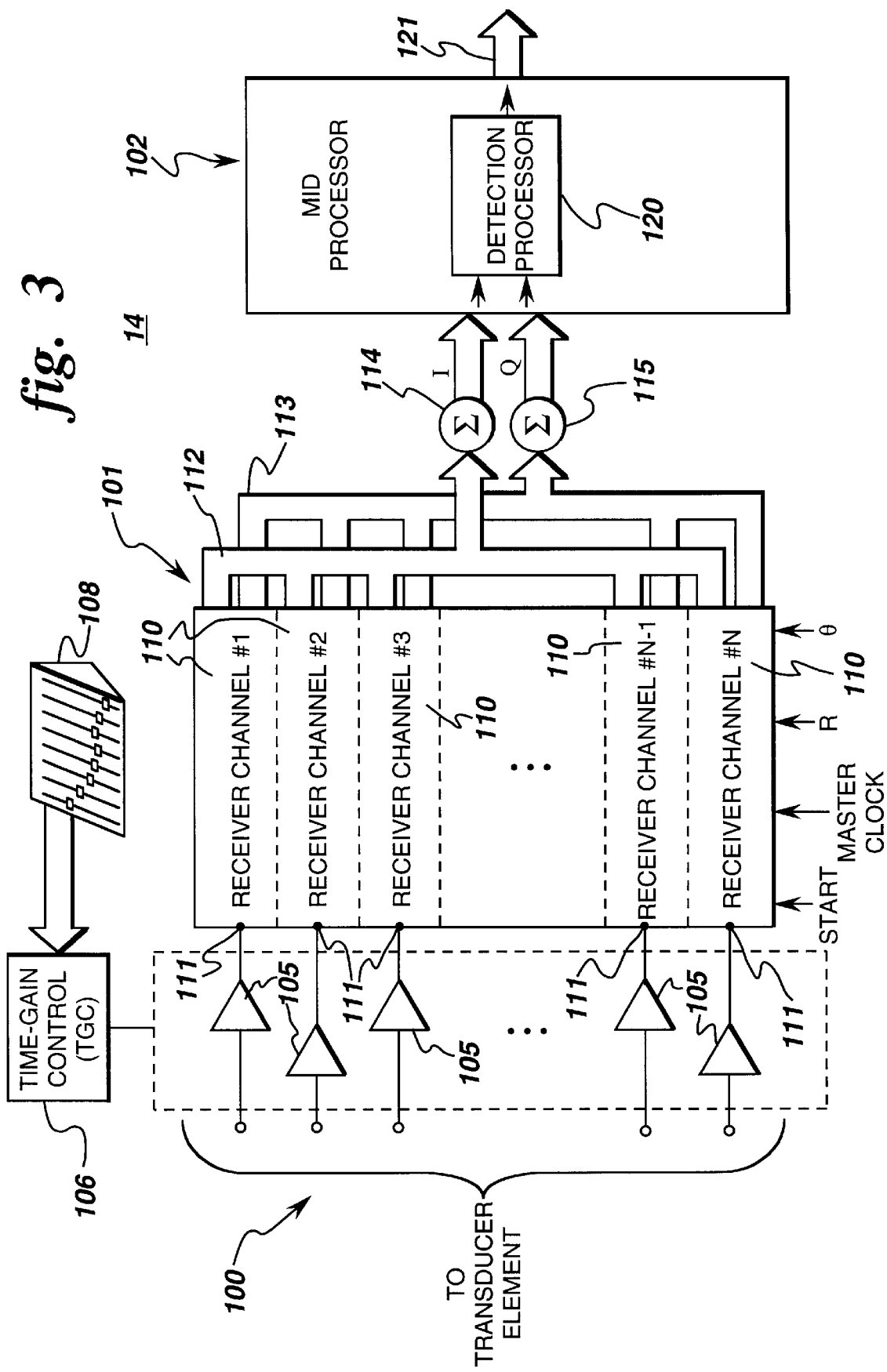
FIG. 3 is a block diagram of a receiver which forms part of the system of FIG. 1.

Referring to FIG. 3 in conjunction with FIG. 1, receiver 14 is comprised of three sections: a time-gain control section 100, a beamforming section 101, and a mid processor 102. The time-gain control section 100 includes an amplifier 105 for each of the n=128 receiver channels and a time-gain control circuit 106. The input of each amplifier 105 is coupled to a respective one of the transducer elements 12 to amplify the echo signal which it receives. The amount of amplification provided by amplifiers 105 is con-trolled by time-gain control circuit 106. As the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) linear potentiometers 108 to values which provide a relatively uniform brightness over the entire range of the sector scan. The time interval over which the echo signal is acquired determines the range from which it emanates, and this time interval is divided into eight segments by time-gain control circuit 106. The settings of the eight potentiometers are employed to set the gains of amplifiers 105 during each of the eight respective time intervals so that the echo signal is amplified in ever-increasing amounts over the acquisition time interval.

The beam forming section 101 of receiver 14 includes n=128 separate receiver channels 110. Each receiver channel 110 receives the analog echo signal from one of amplifiers 105 at an input 111, and produces a stream of digitized output values on an I bus 112 and a Q bus 113. Each of these I and Q values represents a sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam (θ). In the preferred embodiment, each echo signal is sampled at equal intervals of about 150 micrometers over the entire range of the scan line (typically 40 to 200 millimeters).

Midprocessor section 102 receives the beam samples from summing points 114 and 115. The I and Q values of each beam sample are 20-bit digital numbers representing the in-phase and quadrature components of the magnitude of reflected sound from a point (R, θ). Mid processor 102 can perform a variety of calculations on these beam samples, where choice is determined by the type of image to be reconstructed. For example, if a conventional magnitude image is to be produced, a detection processor 120 implements a detection process in which a digital magnitude M is calculated from each beam sample and produced at output 121 according to:

$$M = \sqrt{I^2 + Q^2} \qquad (7)$$

Figure 4:
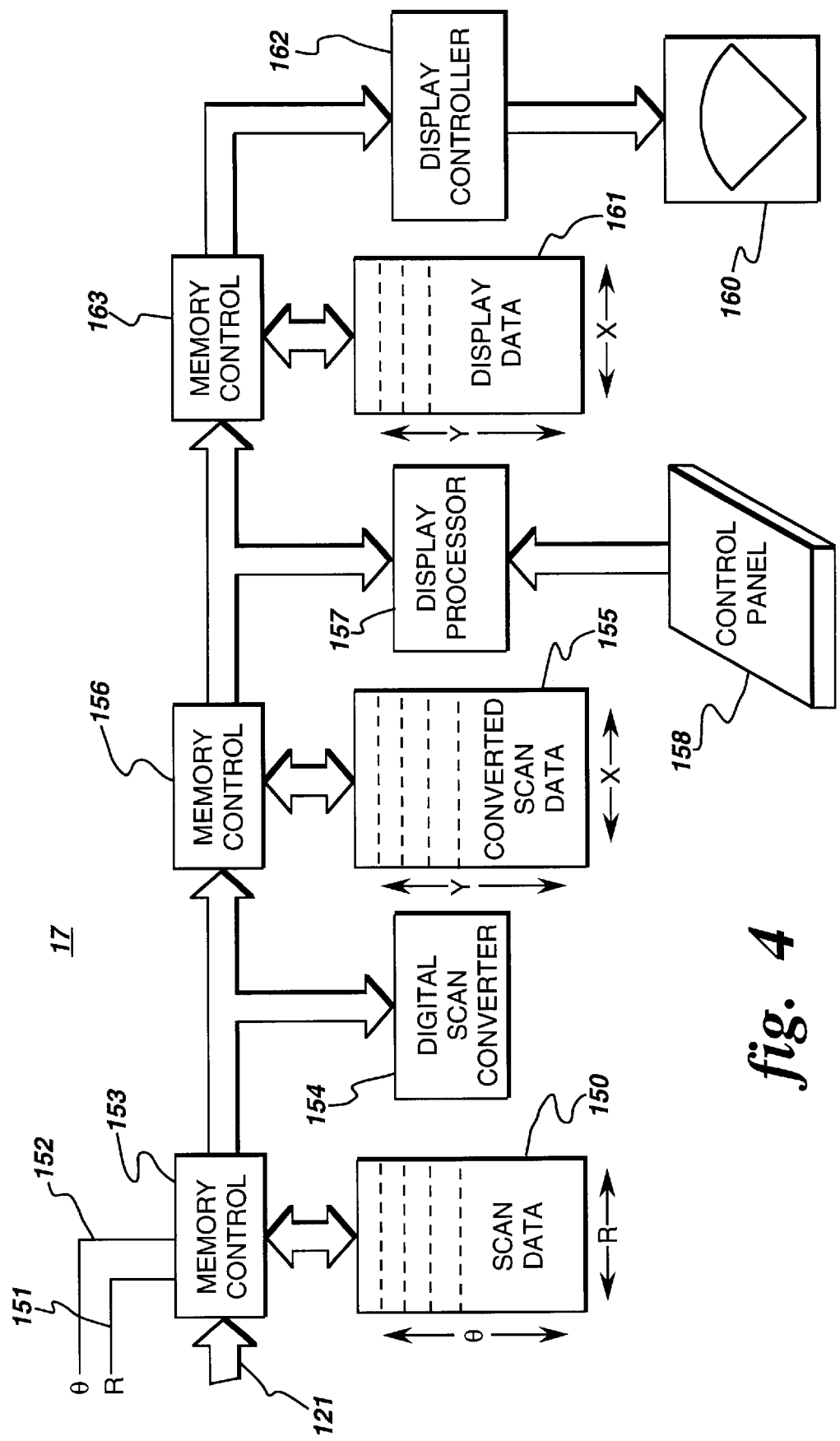
FIG. 4 is a block diagram of a display system which forms part of the system of FIG. 1

Referring to FIGS. 1 and 4, receiver 14 generates a stream of 8-bit digital numbers at its output 121, which stream is applied to the input of display system 17. This "scan data" is stored in a memory 150 as an array, with the rows of scan data array 150 corresponding with the respective beam angles (θ) that are acquired, and the columns of scan data array 150 corresponding with the respective ranges (R) at which samples are acquired along each beam. The R and θ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update scan data array 150.

The scan data in array 150 are read by a digital scan converter 154 and converted to a form producing the desired image. If a conventional B-scan image is being produced, for example, the magnitude values M(R, θ) stored in scan data array 150 are converted to magnitude values M(x, y) which indicate magnitudes at pixel locations (x, y) in the image.

Regardless of the particular conversion made by digital scan converter 154, the resulting image data are written to a memory 155 which stores a two-dimensional array of converted scan data. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced brightness values to a display memory 161.

Display memory 161 is shared with a display controller circuit 162 through a memory control circuit 163, and the brightness values therein are mapped to control brightness of the corresponding pixels in display 160. Display controller 162 is a commercially available integrated circuit designed to operate the particular type of display 160 used. For example, display 160 may be a CRT (cathode ray tube), in which case display controller 162 is a CRT controller chip which provides the required sync pulses for the horizontal and vertical sweep circuits and maps the display data to the CRT at the appropriate time during the sweep.

Display system 17 may take one of many forms depending on the capability and flexibility of the particular ultrasound system. In the preferred embodiment, programmed microprocessors are employed to implement the digital scan converter and display processor functions.

Figure 5:
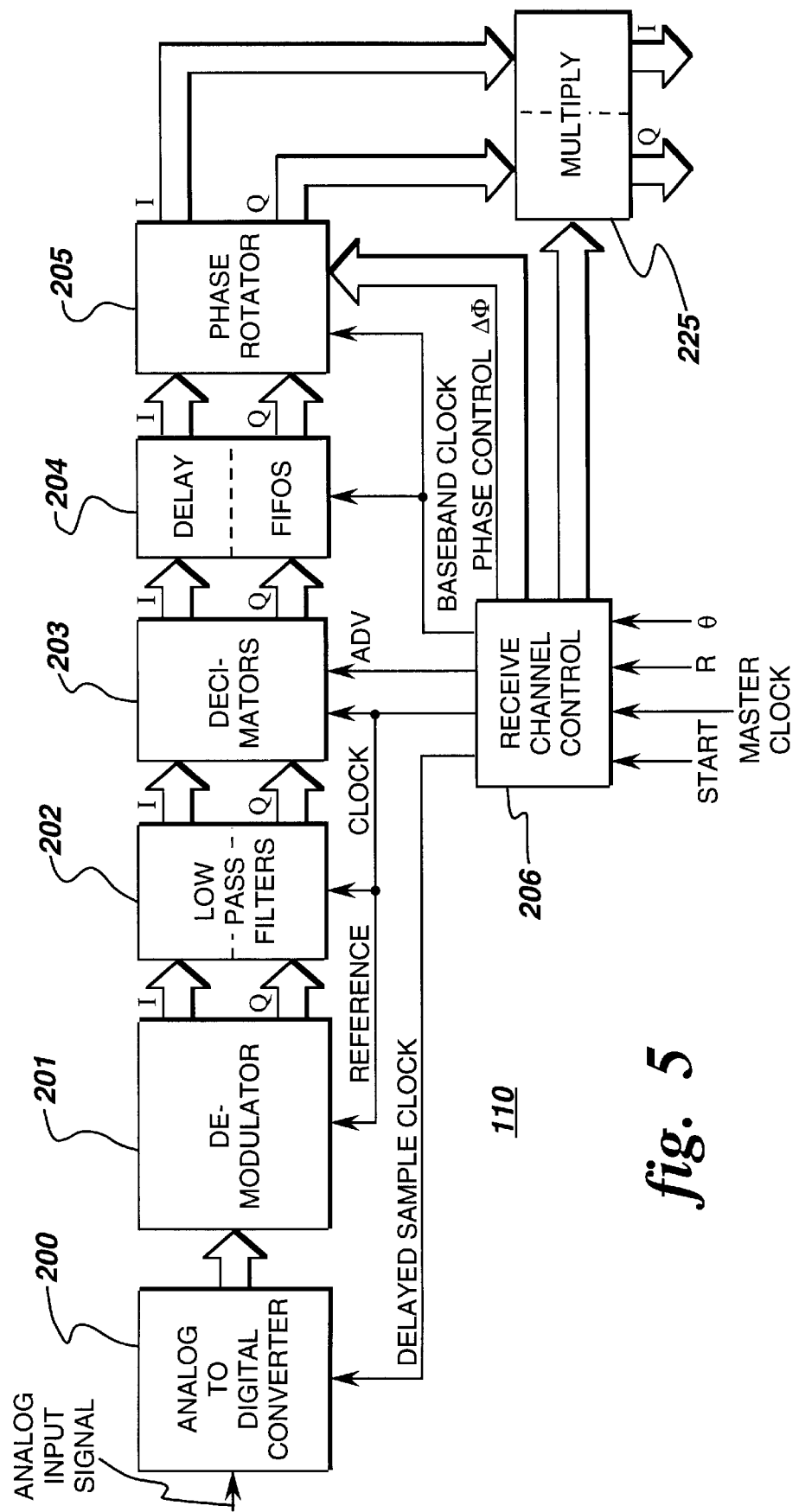
FIG. 5 is a block diagram of a receiver channel which forms part of the receiver of FIG. 3.

As indicated above with reference to FIG. 3, beamforming section 101 of receiver 14 is comprised of a set of receiver channels 110—one for each element 12 of transducer 11 (FIG. 1). As shown in FIG. 5, each receiver channel 110 is responsive to a START command, a 40 MHz master clock and a beam angle signal (θ) from digital controller 16 (FIG. 1) to perform the digital beamforming functions. These include: sampling the analog input signal in an analog-to-digital converter 200; demodulating the sampled signal in a demodulator 201; filtering out the high-frequency sum signals produced by demodulator 201 with low pass filters 202; reducing the data rate in decimators 203; and time-delaying and phase-adjusting the resulting digital data stream in delay FIFOs (i.e., first-in/first-out memories) 204 and phase rotator 205, respectively. All of these elements are controlled by a receive channel control 206 which produces the required clock and control signals in response to commands from digital controller 16 (FIG. 1). In the preferred embodiment, all of these elements are contained on a single integrated circuit.

Analog-to-digital converter 200 samples the analog signal at regular intervals determined by the leading edge of a sample clock signal from receive channel control 206. In the preferred embodiment, the sample clock signal is a 40 MHz clock. This enables use of ultrasonic frequencies of up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40-MHz rate. These samples are supplied to demodulator 201 which mixes each sample with both a reference in-phase with the transmitted ultrasonic carrier, and with a reference in quadrature with the transmitted ultrasonic carrier. The demodulator reference signals are produced from stored SINE and COSINE tables that are read out of their respective ROMs (read-only memories) by a 40 MHz reference clock signal from receive channel control 206. The COSINE value is digitally multiplied by the sampled input signal to produce a demodulated, in-phase value ($I$) signal which is supplied to a low pass filter 202, and the SINE value is digitally multiplied by the same sampled input signal to produce a demodulated, quadrature phase value Q signal which is supplied to a separate low pass filter 202. Low pass filters 202 are finite impulse response filters tuned to pass the difference frequencies supplied by demodulator 201, but block the higher, sum frequencies. The output signal of each low pass filter is a stream of 40 MHz digital values which indicate the magnitude of the $I$ or Q component of the echo signal envelope.

The rate at which the demodulated $I$ and Q components of the echo signal are sampled is reduced by decimators 203. The 12-bit digital samples are supplied to the decimators at a 40 MHz rate, which is unnecessarily high from an accuracy standpoint, and which is a difficult data rate to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. Thus the $I$ and Q output signals of decimators 203 are digitized samples 219 of the echo signal envelope. The decimation ratio and the baseband clock frequency can be changed to values other than 8:1 and 5 MHz.

The echo signal envelope represented by the demodulated and decimated digital samples is then delayed by delay FIFOs 204 and phase shifted by phase rotator 205 to provide the desired beam steering and beam focusing. The $I$ and Q output signals of phase rotator 205 are applied to the inputs of a pair of multipliers 225. The other input of each of multipliers 225 receives from receive channel control 206 an 8-bit window weighting factor ranging in value from 0 to 1.0. The $I$ and Q outputs of multipliers 225 constitute the weighted receive channel output signals which are summed to form the receive beam.

The present invention is intended to calculate for a particular receive channel whose transducer element 12 is located a distance $u_i$ from the center of transducer array 11, as shown in FIG. 1, a value for the window weighting factor L(a). This value ranges from 0 to 1.0 and is a function of the variable a as shown by curve 250 in FIG. 8. The data for window function curve 250 are stored in a random access memory (RAM) 240 of receive channel control 206, shown in FIG. 6, as sixteen values at sixteen equally spaced values of a, the window function values ranging from 0 to 1.0. In the preferred embodiment, the value of a is calculated in real time by receive channel control 206 (FIG. 5) as the echo signal is being processed by the receive channel, and this is employed to determine the proper window weighting factor W(a) from the stored data for window function curve 250 of FIG. 8. The window weighting factor L(a) is supplied to multipliers 225 (FIG. 5) to weight the echo signal samples being produced. For example, the transducer element located at distance $u_i$ from the center of the transducer array may lie outside the receive aperture early in the echo signal reception and its weighting factor L(a) is zero. As the receive aperture opens to include the transducer element at distance $u_i$ from the center of the transducer array, the value of a is 1.0, and as the receive aperture opens further, the value of a drops and the weighting factor L(a) increases along window function curve 250 of FIG. 8.

Figure 8:
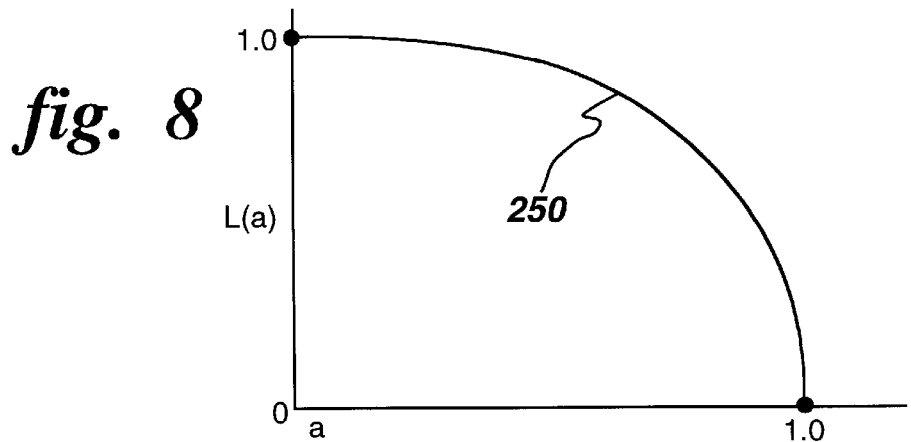
FIG. 8 is a graphical representation of a window function curve which is stored by the circuit of FIG. 5.
Figure 9:
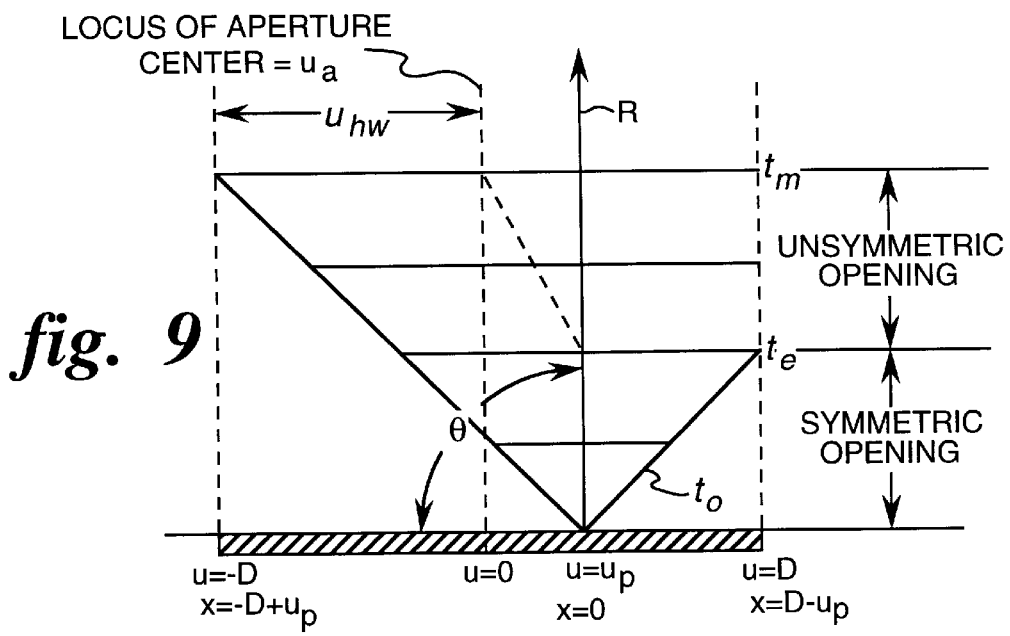
FIG. 9 is a graphical representation of the opening receive aperture and the parameters that enter into determination of the window function weighting factor in accordance with the invention.

As shown in FIG. 9, the value of a required to locate the proper weighting factor L(a) on window function curve 250 of FIG. 8 at any moment in time is calculated as a function of a number of variables including time (t) and beam angle ($\theta$). The phase center ($u_p$) of transducer array 11 can be located anywhere along its length from u=−D to u=D. The center of the receive aperture ($u_a$) will start at the phase center ($u_p$) and remain there during the symmetric opening stage until the nearest end of array 11 is reached at time t=$t_e$. The center of the receive aperture ($u_a$) will shift during the following unsymmetrical opening of the receive aperture and will end at the center of the transducer array (u=0) when the aperture is fully open at time t=$t_m$. The movement of the aperture center, during the asymmetrical phase, occurs at one half the rate of the free edge. An aperture half-width can be defined as $u_{hw}(\theta, t)$ and the location of the aperture center can be defined as $u_a(\theta, t)$. A window centered on the aperture is to be created using, as the aperture equation:

$$W(a) = W\left( \frac{|u_i - u_a(\theta, t)|}{u_{hw}(\theta,t)} \right) \quad (8)$$

To develop the aperture equation, a number of important variables are needed that are easily calculated. The first comes about through simplification of the geometric terms by using an effective velocity $C_a$; the time $t_e$ that the near edge is struck; the time $t_m$ that the far edge is struck; and the "turn on" time $t_0$, as defined in Eqs. (9)–(12):

$$C_a = \frac{C/2}{2F\cos\theta} \quad (9)$$

$$t_e = \frac{D - |u_p|}{C_a} \quad (10)$$

$$t_m = \frac{D + |u_p|}{C_a} \quad (11)$$

$$t_o = \frac{u - |u_p|}{C_a} \quad (12)$$

It is more convenient to use a coordinate system with its center (x=0) at the phase center of the array. If the window is defined to be an array in memory, the argument (a) can be thought of as a table address function Add(t,x) that starts at some maximum table address M and runs to zero. The address function can then be defined in light of this convention. There will be a separate value of Add(t,x) for each element in the transducer array. Operating together, they provide the desired time-varying aperture.

Figure 10:
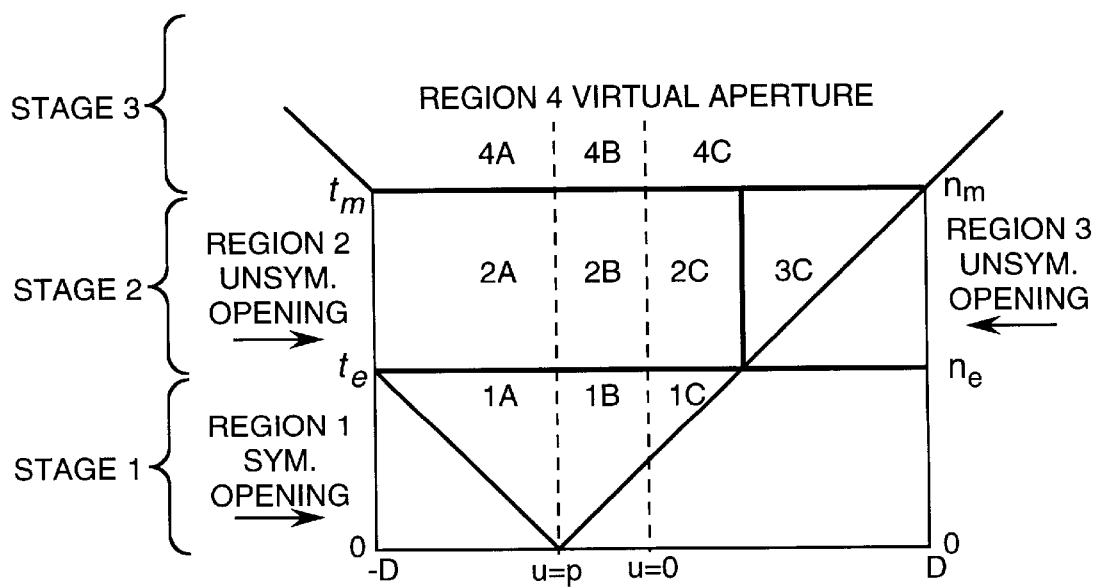
FIG. 10 is a graphical representation of the opening receive aperture showing the various regions that require different consideration during the dynamic window determination in accordance with the invention.

The most usable form for the dynamic calculation of the address Add(t,x) of the window function was formulated in U.S. Pat. No. 5,345,939 as follows for the regions indicated in FIG. 10:

$$\text{Add }(t, x) = M \frac{t_o}{t} \quad \text{for } t_o \leq t \leq t_e \tag{13a}$$

for Region 1;

$$\text{Add }(t, x) = M \left| \frac{2(t_e - Rt_o)}{t_e + t} - 1 \right| \text{ for } t_e \leq t \leq t_m \tag{13b}$$

for Regions 2 and 3; and $$\text{Add }(t, x) = M \frac{|t_o + R(t_m - t_e)/2|}{t + (t_e - t_m)/2} \quad \text{for } t_m \leq t \tag{13c}$$

for Region 4, where R=+1 for Region A and R=−1 for regions B and C in FIG. 10. During the first stage of symmetric aperture opening the table address changes as $Mt_o/t$. During the second stage, which is an unsymmetric opening stage, the address changes as a function of $1/t$, but with a delay. This delay can be accommodated by an offset bias added to the solution. Finally, in a third stage, after full aperture opening, the virtual aperture may continue to open symmetrically centered on the transducer array physical center. The solutions in the unsymmetric opening stage and virtual aperture opening stage depend upon the variable R.

As shown in FIG. 10, the transducer array has its phase center $u_p$ located to the left of the physical center u of the array. For this geometry the near edge of the transducer array is "struck" by the left side of the opening aperture to define the time $t_e$. As aperture opening continues, the far edge of the transducer array is struck, defining the time $t_m$. For the phase center on the right, a mirror image of FIG. 10 applies.

Equations (13a)–(13c) are calculated dynamically during receipt of the echo signal by each receive channel control 206 (FIG. 5). These dynamic calculations are performed by a dynamic window function generator 202, shown in FIG. 6, and the resulting window weighting factors which it produces are applied to multipliers 225, as described above. Since for each receive channel the location x of its transducer element is fixed and the phase center ($u_p$) for each firing is fixed, many of the calculations are performed by digital controller 16 (FIG. 1) prior to firing and then downloaded to the dynamic window function generator.

Figure 6:
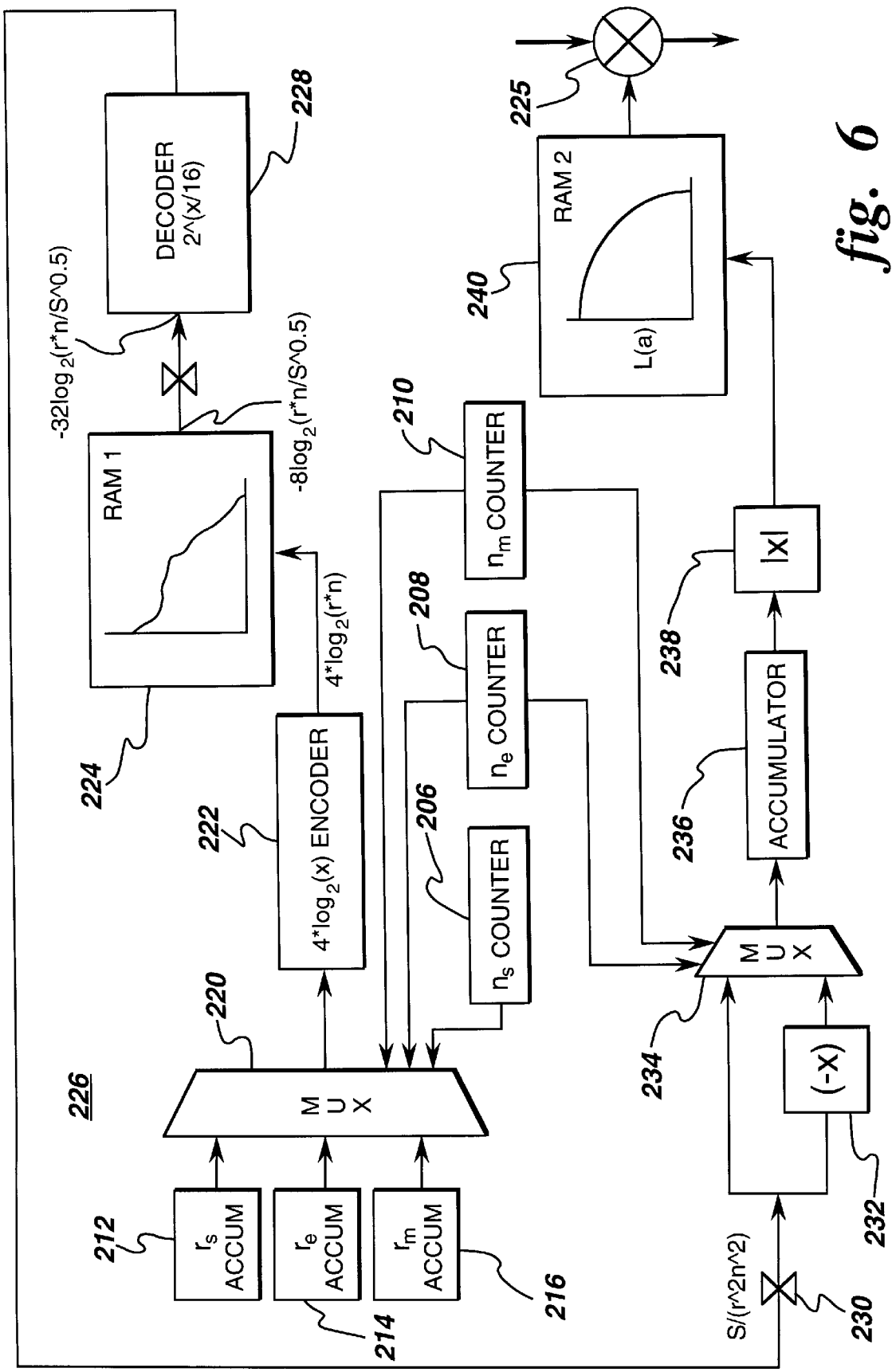
FIG. 6 is a block diagram of a dynamic window circuit in accordance with the preferred embodiment of the invention.

The improved dynamic window function generator of the invention is depicted in FIG. 6. The circuit of FIG. 6 is initialized at the start of each beam firing by values downloaded from digital controller 16 (FIG. 1). These include values $n_0$, $n_e$ and $n_m$, which represent the respective times $t_0$, $t_e$ and $t_m$ measured in counts of the 5 MHz range clock. These values are stored in counters 206, 208, 210, respectively, and provide indications of the various phases of aperture opening.

Three accumulators 212, 214, 216, repeatedly add gradient parameters ($r_s$, $r_e$ and $r_m$) on each 10 MHz range clock. The gradient parameters are determined in accordance with the following equations:

$$r_s = \sqrt{\frac{S}{c_s W n_s}} \tag{14a}$$

$$r_e = \sqrt{\frac{S(1 - n_e/n_m)}{W(c_e - c_m)n_e}} \tag{14b}$$

$$r_m = \sqrt{\frac{S}{c_m W n_m}} \tag{14c}$$

where W is the shading divisor (having a typical value of 512); $c_S$ is the largest address in RAM 240 (typically 127); $c_e$ is the dynamic shading address at $n_e$; and $c_m$ is the dynamic shading address at $n_m$. In accordance with the invention, different values of the gradient parameters require different choices of S. $S^{-\frac{1}{2}}$ functions as a scaling parameter for all three gradients. Its value is only concerned with minimizing round-off error, and does not affect scaling of the final result. S is determined by computer simulation to minimize the difference between Eqs. (3) and (4) and what the circuit actually produces. Typical values of S are in the range of $10^9$–$10^{10}$.

The output signals of accumulators 212, 214, 216 are applied to respective inputs of a multiplexer 220. The multiplexer switches at respective counts of $n_0$, $n_e$ and $n_m$, thereby selectively passing the respective gradient parameters to an encoder 222. The output signals of these accumulators are multiplexed so that the input signal of encoder 222 is:

$$r(n) = \begin{cases} 0 & \text{if } n < n_s \\ r_s n & \text{if } n_s < n < n_e \\ r_e n & \text{if } n_e < n \leq n_m \\ r_m n & \text{if } n > n_m \end{cases} \tag{15}$$

The encoder log-compresses the switched ramp waveform of Eq. (15). Such compression is necessary because the dynamic range of the derivative of y(n), given in Eq. (4), is a piecewise $1/n^2$ function. The actual function computed by the encoder is $4\log_2 r(n)$. This forms the address of a RAM 224 which, in its simplest form, has an output signal proportional to −2 times the address. Because integer arithmetic is being performed, a scaling factor $4\log_2 S$ is added to the data in RAM 224. Thus, the output signal of RAM 224 varies with time as $-8\log_2\{r(n)/S^{-\frac{1}{2}}\}$. A bit shifter 226 shifts the data two bits to the left (multiplication by 4) to improve the numerical conditioning. Thereafter, a decoder 228 computes the function $2^{x/16}$, to produce an output signal of $1/[Sr^2(n)]$. This output signal is then divided by W (which is typically equal to 512) using a bit shifter 230. The output signal of bit shifter 230 is inverted by an inverter 232. Both the inverted and non-inverted bit shifter output signals are supplied to a multiplexer 234, which inverts the signal if necessary (whether or not this is needed depends on the relative sizes of $n_s$ and $n_e$). In the case described by Eq. (4), the output signal of multiplexer 234 is a derivative:

$$d(n) = \begin{cases} 0 & \text{if } n < n_s \\ S/[r_s^2 n^2] & \text{if } n_s < n < n_e \\ -S/[r_e^2 n^2] & \text{if } n_e < n \leq n_m \\ S/[r_m^2 n^2] & \text{if } n > n_m \end{cases} \tag{16}$$

An accumulator 236 integrates this function, transforming the derivative into the desired address y(n):

$$y(n) = \begin{cases} 0 & \text{if } n < n_s \\ -S/[r_s^2 n] & \text{if } n_s < n < n_e \\ -S/[r_s^2 n_e] + S/[r_e^2 n] & \text{if } n_e < n \leq n_m \\ -S/[r_s^2 n_e] + S/[r_e^2 n_m] - S/[r_m^2 n] & \text{if } n > n_m \end{cases} \tag{17}$$

With appropriate choices of gradient parameters ($r_s$, $r_e$ and $r_m$) Eq. (17) becomes equal to Eq. (4). The absolute value function 238 which follows accumulator 236 performs a simple technique to halve the size of memory needed in a RAM 240. Since the window function required is always symmetrical about the center of the shading function of Eq. (3), only half of the window function need be stored in order to be fully responsive to the magnitude of the address generated by accumulator 236. The data stored in RAM 240 is for any type of tapered aperture [a Blackman-Harris window, for example, as disclosed by F. J. Harris in "On the use of windows for harmonic analysis with the discrete Fourier transform," Proc. IEEE, Vol. 66, No. 1, pp. 51–83 (1978)]. The weighting factors produced by RAM 240 are supplied to a multiplier 225, which has another input for receiving the ultrasound acoustic signal. Multiplier 225 modulates the gain of the channel in a time-dependent way that achieves the desired window function.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. An ultrasonic imaging system comprising:

an ultrasonic transducer array having a set of array elements disposed in a pattern and each being separately operable to produce a pulse of ultrasonic energy through a medium during a transmission mode and to produce an echo signal in response to ultrasonic energy impinging thereon during a receive mode;

a transmitter coupled to the ultrasonic transducer array and operable during the transmission mode to apply a separate signal to predetermined array elements such that a steered transmit beam is produced by the array;

a receiver coupled to the ultrasonic transducer array and operable during the receive mode to sample the echo signal produced by selected array elements as the ultrasonic energy impinges thereon and to form a receive beam signal therefrom by separately delaying, apodizing and summing the respective echo signals sampled from each array element; and a display system coupled to receive the receive beam signal and produce an image therefrom, wherein the receiver has a plurality of channels operable by respective receive channel control circuits to apodize the sampled echo signals produced by the transducer array elements with respective selected window function weighting factors as the echo signals are received, each receive channel control circuit comprising:

memory means for storing a set of window function weighting factors at successive memory address locations; and addressing means for producing an address useable by the memory means to produce a desired window function weighting factor for each receive channel from the stored set of window function weighting factors, wherein said addressing means comprises derivative signal producing means for producing a signal representing the derivative of said address and means for integrating said signal representing the derivative of said address.

2. The ultrasonic imaging system as defined in claim 1, wherein said each receive channel control circuit further comprises:

first, second and third counters for producing respective multiplexer switching signals at first, second and third counts;

a multiplexer connected to be switched in response to said respective multiplexer switching signals;

first, second and third accumulators having respective outputs connected in parallel to respective inputs of said multiplexer and respective inputs for receiving first, second and third gradient parameters respectively, and for accumulating said first, second and third gradient parameters, respectively, said multiplexer being adapted to multiplex the accumulated first, second and third gradient parameters in response to said respective multiplexer switching signals to produce a switched ramp waveform.

3. The ultrasonic imaging system as defined in claim 2, wherein said each receive channel circuit further comprises an encoder responsive to output signals from said multiplexer for producing a compressed version of said switched ramp waveform.

4. The ultrasonic imaging system as defined in claim 3, wherein said encoder is adapted to compute the function $4\log_2 r(n)$, where $r(n)$ represents said switched ramp waveform.

5. The ultrasonic imaging system as defined in claim 3, wherein said each receive channel circuit further comprises a first random access memory addressed by said compressed switched ramp waveform, said random access memory being adapted to store data so as to provide output signals proportional to $-2$ times the address of said first random access memory.

6. The ultrasonic imaging system as defined in claim 4, wherein said each receive channel circuit further comprises a first random access memory addressed by said compressed switched ramp waveform, said random access memory being adapted to store data so as to provide output signals that vary with time as $-8\log_2\{r(n)/S^{-\frac{1}{2}}\}$, where S is a scaling parameter.

7. The ultrasonic imaging system as defined in claim 6, wherein said each receive channel circuit further comprises a decoder for receiving output signals of said first random access memory, said decoder being adapted to compute the function $2^{x/16}$ so as to produce an output signal represented by $1/[Sr^2(n)]$.

8. The ultrasonic imaging system as defined in claim 7, wherein said means for integrating the signal representing the derivative of said address comprises a fourth accumulator for integrating output signals of said decoder, said memory means comprising a second random access memory, and a multiplier, said second random access memory being adapted to select a window function weighting factor for application to said multiplier in response to signals from said addressing means.

9. A method for apodizing the aperture of an ultrasonic imaging system comprising an ultrasonic transducer array having a set of array elements disposed in a pattern, comprising the steps of:

separately operating said array elements to produce a pulse of ultrasonic energy through a medium during a transmission mode and to produce an echo signal in response to ultrasonic energy impinging thereon during a receive mode, said pulses in said transmission mode forming a steered transmit beam and said echo signals being sampled in said receive mode to produce a receive beam signal therefrom by separately delaying, apodizing and summing the respective echo signals sampled from each array element; and producing an image as a function of said receive beam signal, said apodizing step comprising:

multiplying the sampled echo signals produced by the transducer array elements with respective selected window function weighting factors as the echo signals are received, said window function weighting factors being retrieved from a random access memory by first computing the derivative of an addressing function and then integrating said derivative to provide the addresses for selecting required window function weighting factors from said random access memory.

* * * * *